United States Patent
Schulze et al.

(10) Patent No.: US 12,095,246 B2
(45) Date of Patent: Sep. 17, 2024

(54) DIAGNOSTIC SYSTEM FOR A LEVEL-CROSSING SAFEGUARDING SYSTEM, CURRENT SENSOR FOR SUCH A DIAGNOSTIC SYSTEM, AND METHOD FOR INSTALLING SUCH A DIAGNOSTIC SYSTEM

(71) Applicant: Siemens Mobility GmbH, Munich (DE)

(72) Inventors: Michael Schulze, Berlin (DE); Olaf Vogt, Berlin (DE); Robert Busse, Schoenwalde (DE)

(73) Assignee: Siemens Mobility GmbH, Munich (DE)

( * ) Notice: Subject to any disclaimer, the term of this patent is extended or adjusted under 35 U.S.C. 154(b) by 249 days.

(21) Appl. No.: 17/615,250

(22) PCT Filed: May 11, 2020

(86) PCT No.: PCT/EP2020/063034
§ 371 (c)(1),
(2) Date: Nov. 30, 2021

(87) PCT Pub. No.: WO2020/239419
PCT Pub. Date: Dec. 3, 2020

(65) Prior Publication Data
US 2022/0239079 A1    Jul. 28, 2022

(30) Foreign Application Priority Data

May 31, 2019  (DE) .................... 10 2019 208 017.0
Jun. 26, 2019  (DE) .................... 10 2019 209 237.3

(51) Int. Cl.
*H02G 3/04*  (2006.01)
*G16Y 10/75*  (2020.01)

(52) U.S. Cl.
CPC .......... *H02G 3/0418* (2013.01); *G16Y 10/75* (2020.01); *H02G 3/0437* (2013.01)

(58) Field of Classification Search
CPC ...... H02G 3/04; H02G 3/0418; H02G 3/0437; G16Y 10/75
(Continued)

(56) References Cited

U.S. PATENT DOCUMENTS 5,735,492 A    4/1998  Pace
10,279,760 B2  5/2019  Froeschl
(Continued)

FOREIGN PATENT DOCUMENTS

| DE | 102015201440 A1 | 7/2016 |
| EP | 0627802 A1 | 12/1994 |
| WO | 2014059487 A1 | 4/2014 |

OTHER PUBLICATIONS

Thiel, Roger: "Bahnuebergangs-Sicherungstechnik RBUET realisierungsnah planen"; Signal + Draht (94) May 2002, p. 14-17; 2002.
(Continued)

*Primary Examiner* — Tremesha S Willis
(74) *Attorney, Agent, or Firm* — Laurence A. Greenberg; Werner H. Stemer; Ralph E. Locher

(57) ABSTRACT

A diagnostic system for a level-crossing safeguarding system. The safeguarding system has a relay circuit with electrical connection cables that are at least partly guided in a cable conduit. The cable conduit has a longitudinal access side with a detachable cover. The diagnostic system is simplified in that the cover is configured for receiving a plurality of current sensors of the diagnostic system and the plurality of current sensors are disposed, in particular fastened, next to one another in the cover in the longitudinal direction of the cover. There is also described a current (Continued)

sensor for such a diagnostic system and to a method for installing such a diagnostic system.

20 Claims, 4 Drawing Sheets

(58) Field of Classification Search
USPC .......................................................... 174/68.1
See application file for complete search history.

(56) References Cited

U.S. PATENT DOCUMENTS

2011/0109301 A1* 5/2011 Johnson ............. H01R 13/6633
324/126
2013/0256466 A1 10/2013 Carson et al.

OTHER PUBLICATIONS

Stefan Esser; Matthias Ide: "IDIS plus W95—ein modernes Diagnosesystem fuer EBUET 80", Signal + Draht (90) Nov. 1998, p. 14-19; 1998.

* cited by examiner

DIAGNOSTIC SYSTEM FOR A LEVEL-CROSSING SAFEGUARDING SYSTEM, CURRENT SENSOR FOR SUCH A DIAGNOSTIC SYSTEM, AND METHOD FOR INSTALLING SUCH A DIAGNOSTIC SYSTEM

FIELD AND BACKGROUND OF THE INVENTION

The invention relates to a diagnostic system for a level crossing safeguarding system.

A diagnostic system of this kind is known, for example, from the article "IDIS plus W95—ein modernes Diagnosesystem für EBÜT 80" ["IDIS plus W95—a modern diagnostic system for EBÜT 80"], Signal+Draht (90) November 1998, pages 14-19. In this diagnostic system, a specific relay interface is provided in order to capture information of selected adaptation points of the relay circuit and output it to a diagnostics PC. Relay interfaces of this kind require a high level of development effort.

The already-mentioned EBÜT 80 (standard level crossing technology), for example, controls a large number of (up to 21) switching situations, for which it is desirable to capture information (see "Bahnübergangs-Sicherungstechnik RBÜT realisierungsnah planen" ["implementation-oriented planning of level crossing protection technology RBÜT"], Signal+Draht (94) May 2002, pages 14-17).

It is additionally known from practice that, in EBÜT 80, the relay circuit has electrical connection cables, of which at least a plurality are guided in a cable duct, at least in sections, of which the access longitudinal side is provided with a detachable covering.

SUMMARY OF THE INVENTION

Starting from a prior art diagnostic system, the invention is based on the object of simplifying the diagnostic system, in particular with regard to the development effort and the high costs associated therewith.

This object is achieved by a diagnostic system according to the invention, in which the covering is suitably embodied to accommodate a plurality of current sensors of the diagnostic system and the plurality of current sensors are arranged, in particular fastened, adjacent to one another in the longitudinal direction of the covering in said covering.

It is therefore possible to capture the desired information regarding the switching situations without using a specific relay interface. The sensors can therefore be installed in a simple manner, meaning that the diagnostic system can be easily retrofitted in existing level crossing safeguarding systems. In particular, it is advantageous that the diagnostic system according to the invention is very simple and therefore cost-effective with regard to a need to verify that it does not have repercussions on the primary system on which diagnostics are to be performed—here the level crossing safeguarding system.

It is considered to be advantageous if the width of the covering substantially corresponds to the width of the cable duct. This has the advantage that access to other parts of the level crossing safeguarding system is not made difficult.

It is also considered to be advantageous if the depth of the covering is less than or equal to the depth of the cable duct. This has the advantage that the load-bearing capacity of the cable duct can be used without specifically having to fix it more strongly.

In a preferred embodiment of the invention, it is provided that the plurality of current sensors, forming a communication bus, are connected to the data collection facility and output their measurement data to said data collection facility. In particular, this makes it possible to ensure that the measurement data is captured correctly in its chronological order, wherein just knowing the chronological order of the measurement data is particularly advantageous for accurate diagnostics of the switching situations.

It is considered to be advantageous if the current sensors are suitably embodied to transfer the measurement data to the data collection facility by means of a serial transfer protocol via the communication bus. A Modbus, in particular a Modbus RTU, may be used as communication bus, for example.

Preferably, the data collection facility is embodied as an Internet of Things box (known to the person skilled in the art, IoT box for short), which has a communication interface, in particular an antenna, for communicating with a higher-level information technology infrastructure, which is present in the form of a cloud, for example.

The invention also relates to a current sensor for a diagnostic system according to the invention, in which a section can be opened in order to encompass one of the electrical connection cables that is assigned to it in the manner of a clamp.

It is considered to be advantageous if the part of the current sensor that is embodied in the manner of a clamp forms a part of a sensor core and protrudes at least partially into the cable duct.

It is provided that the current sensor is at most 50 mm wide, at most 50 mm deep and at most 70 mm long, in order to take up as little installation space as possible.

Preferably, the current sensor is less than 45 mm wide, less than 40 mm deep and less than 45 mm long.

Preferably, the current sensor is embodied as a direct current sensor with a measurement range from 10 to 200 mA.

It is further considered to be advantageous if the current sensor in each case has a first connection embodied as a socket and a second connection embodied as a plug, wherein the first connection is embodied as a Micro USB socket at one cable end of a first cable, which in particular is at least 15 cm long, and wherein the second connection is embodied as a Micro USB plug at one cable end of a second cable, which in particular is at least 15 cm long.

The invention additionally relates to a method for installing a diagnostic system in a level crossing safeguarding system, of which the relay circuit has electrical connection cables, of which at least a plurality are guided in a cable duct, at least in sections, of which the access longitudinal side is provided with a detachable covering. According to the invention, the covering is suitably provided to accommodate a plurality of current sensors of the diagnostic system, and a plurality of current sensors are arranged, in particular fastened, adjacent to one another in the longitudinal direction of the covering in said covering, wherein a section of a respective one of the current sensors is opened in order to encompass one of the electrical connection cables that is assigned to it in the manner of a clamp, and is closed again once the connection cable has been inserted.

Preferably, the plurality of current sensors, forming a communication bus, are connected to a data collection facility and output their measurement data to said data collection facility, in particular by means of a serial transfer protocol. As already mentioned, a Modbus, in particular a Modbus RTU, may be used as communication bus, for example.

BRIEF DESCRIPTION OF THE FIGURES

The invention is furthermore described in greater detail below with reference to FIGS. 1 to 7, in which.

DETAILED DESCRIPTION OF THE INVENTION

Figure 1:
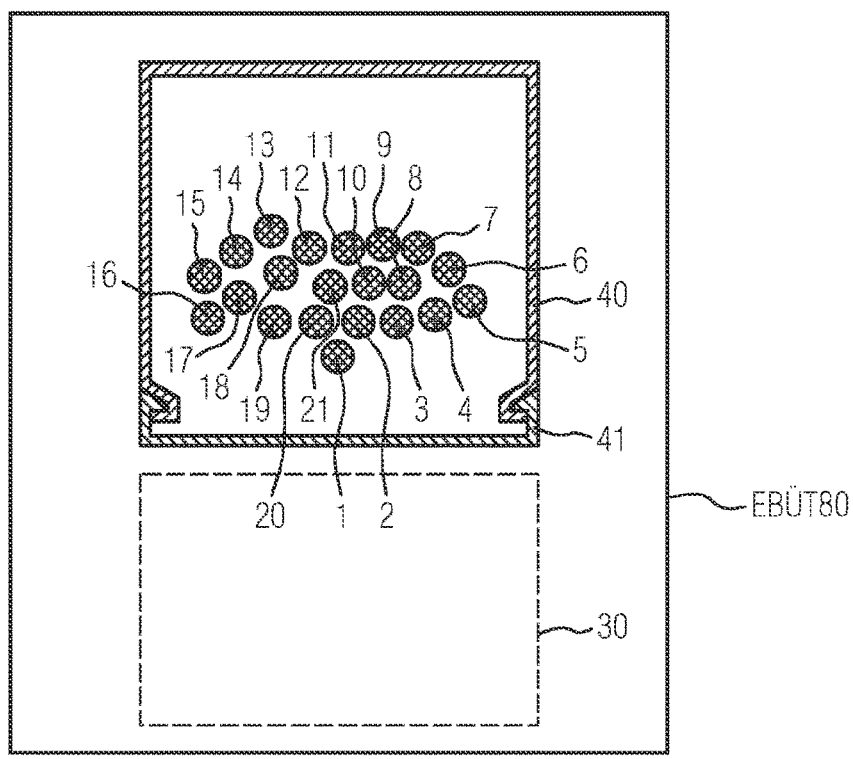
FIG. 1 shows a schematic representation of a level crossing safeguarding system with diagnostic system according to the prior art.

According to FIG. 1—as already mentioned in the introduction—level crossing safeguarding systems EBÜT80 known from the prior art have a diagnostic system 30. Additionally, the relay circuit of said known level crossing safeguarding systems EBÜT80 has electrical connection cables 1-21, of which at least a plurality are guided in a cable duct 40, at least in sections, of which the access longitudinal side is provided with a detachable covering 41.

Figure 2:
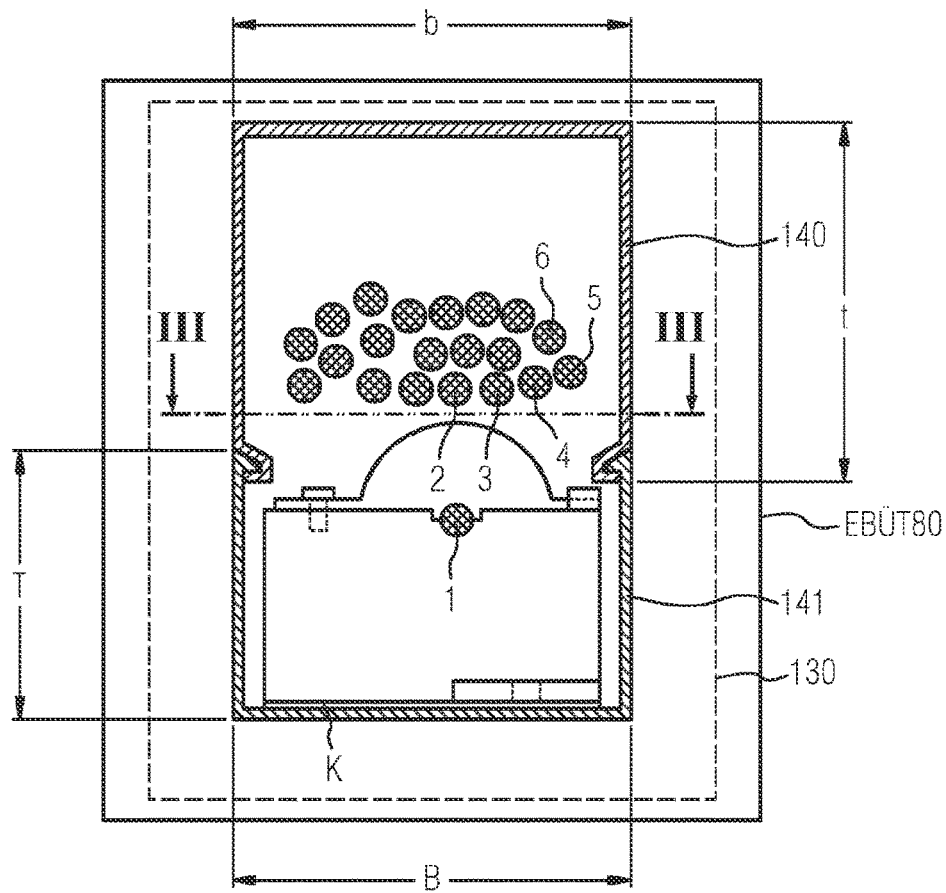
FIG. 2 shows a schematic representation of a level crossing safeguarding system with a first embodiment of the diagnostic system according to the invention.
Figure 3:
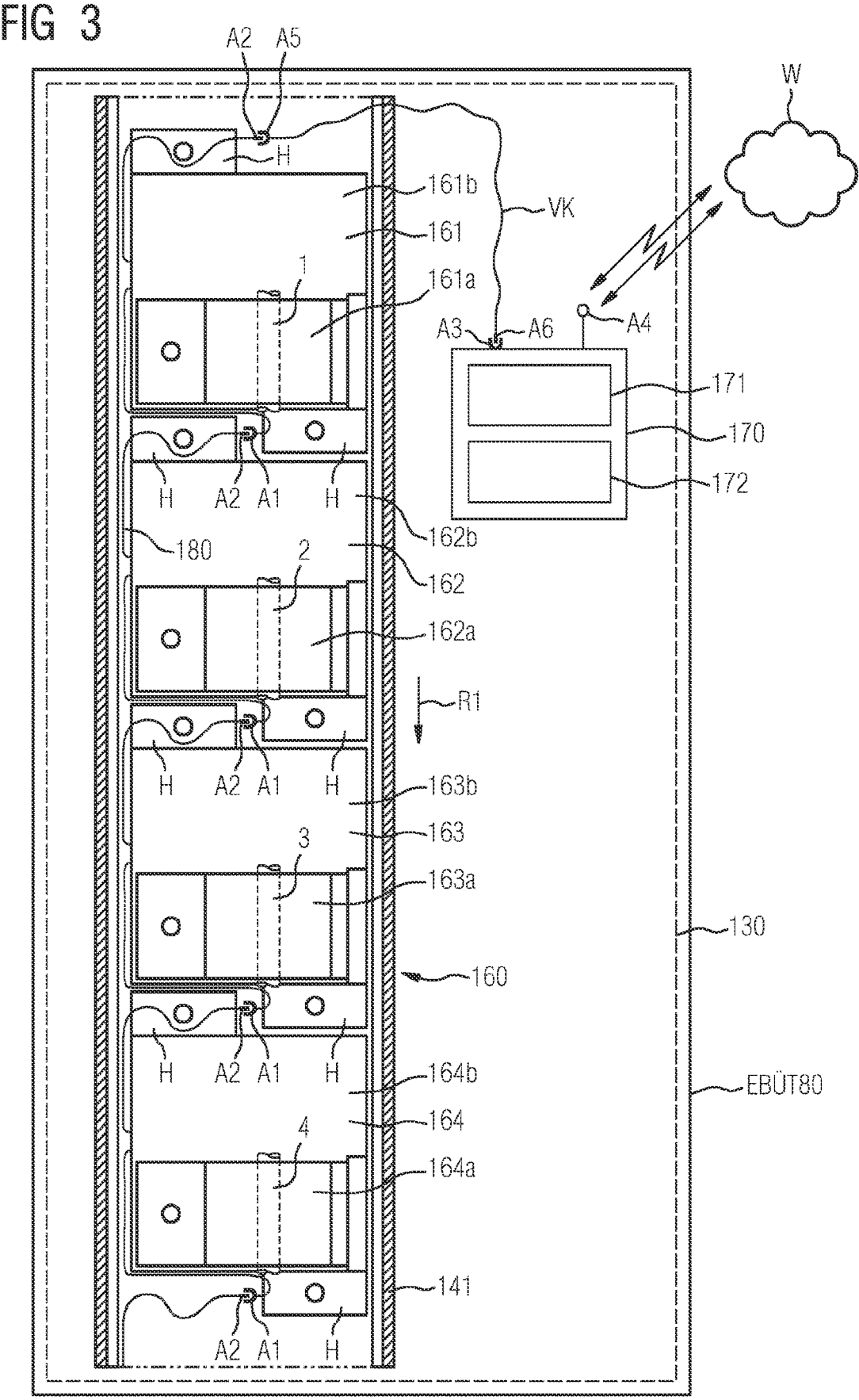
FIG. 3 shows a sectional representation of the first embodiment of the diagnostic system according to the invention along the line III-III in FIG. 2.
Figure 4:
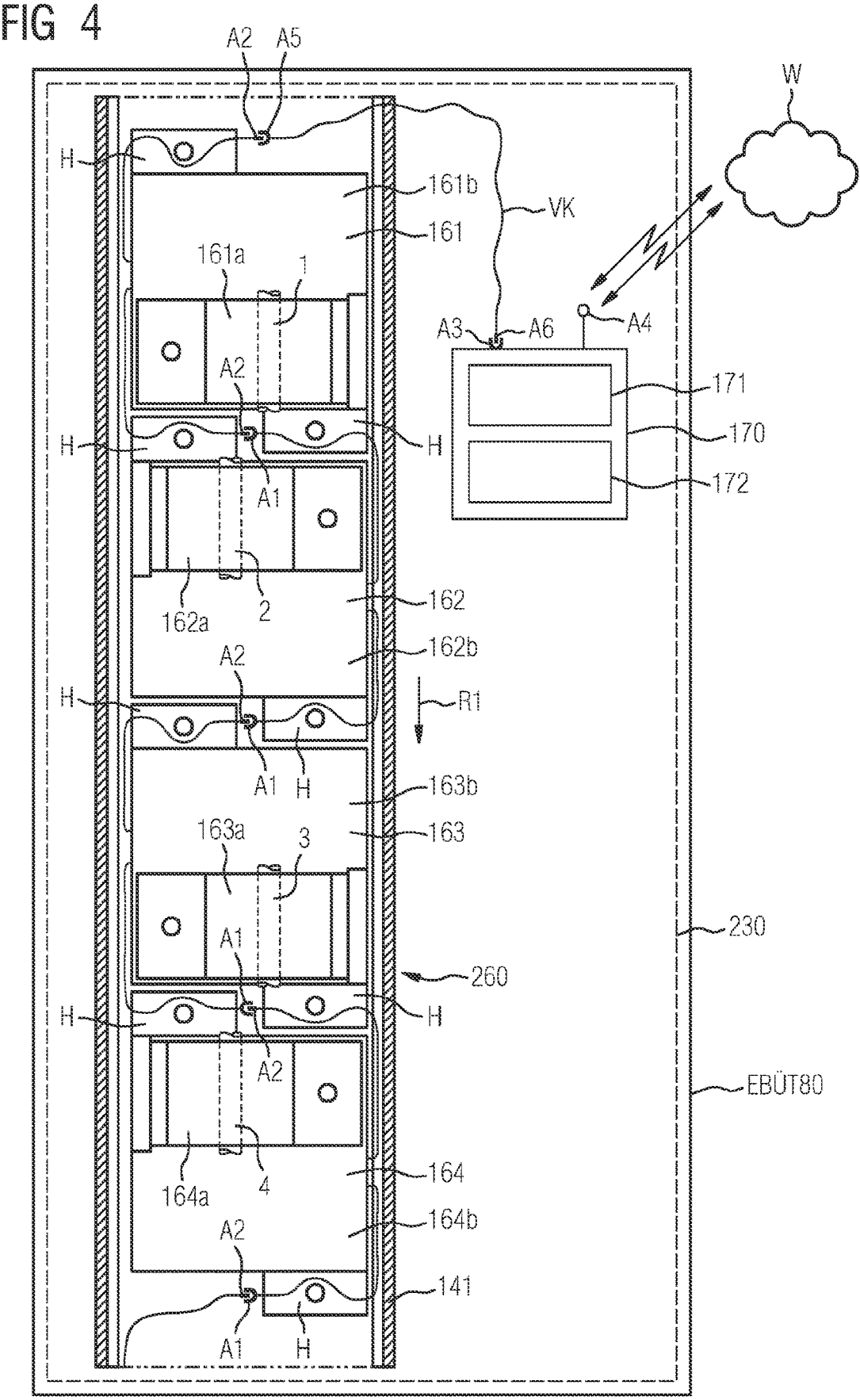
FIG. 4 shows a sectional representation of a second embodiment of the diagnostic system according to the invention and FIGS. 5 to 7 show various views of a current sensor of the diagnostic system according to the invention.
Figure 5:
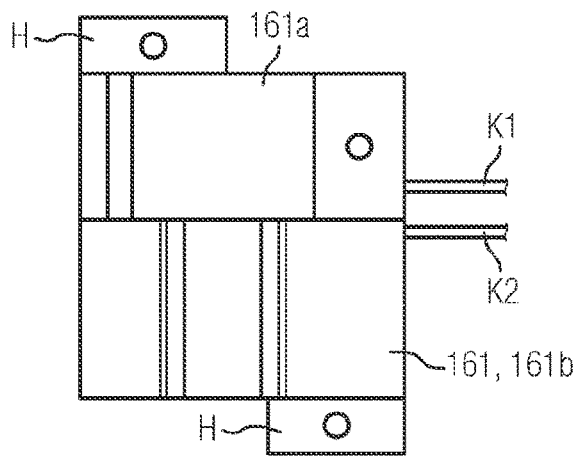
Figure 6:
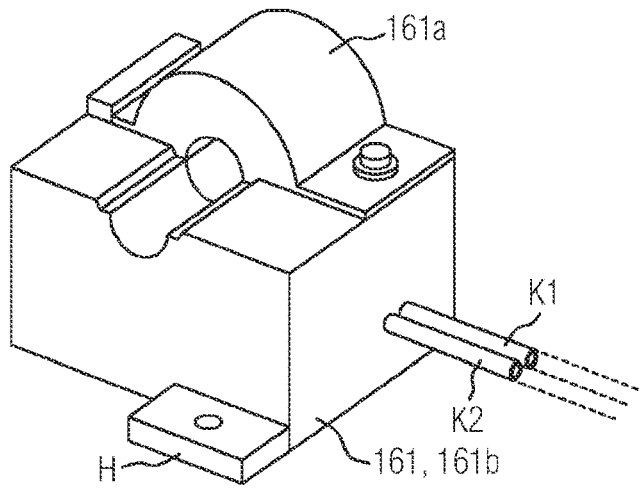

In the level crossing safeguarding system EBÜT80 shown in FIGS. 2 and 3, which has a first embodiment 130 of the diagnostic system according to the invention, and in the level crossing safeguarding system EBÜT80 shown in FIG. 4, which has a second embodiment 230 of the diagnostic system according to the invention, the respective covering 141 is suitably embodied for accommodating a plurality of current sensors 161-164 of the diagnostic system 130 or 230. The current sensors 161-164, together with the covering 141, form a current sensor facility 160 or 260.

Figure 7:
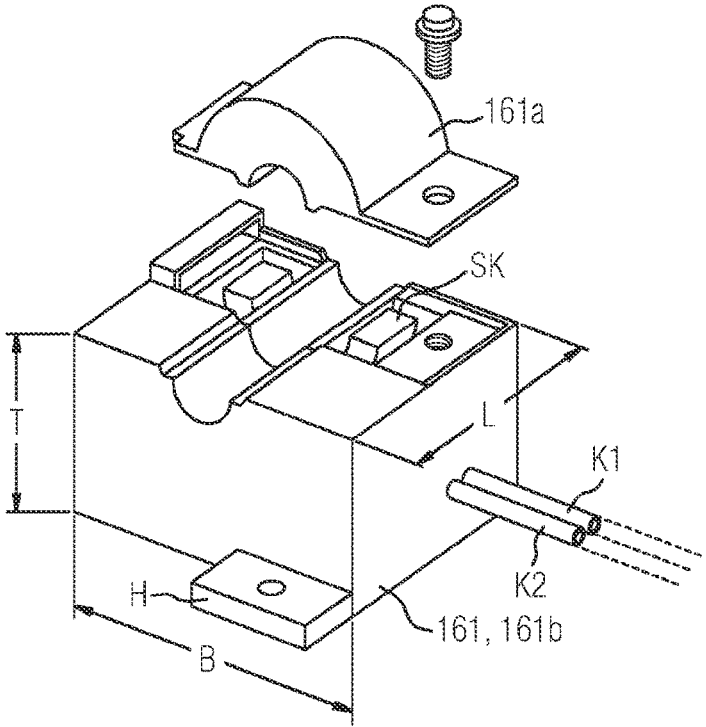

The current sensors 161-164 are, for example, Hall effect sensors that have a sensor core SK (see FIG. 7) in a known manner. However, the invention is not restricted to Hall effect sensors. In particular, it is also possible for sensors to be used which are not based on the Hall effect, but rather on other operating principles.

According to FIGS. 3 and 4, the plurality of current sensors 161-164 are arranged adjacent to one another in the longitudinal direction R1 of the covering 141 in said covering 141 in both embodiments 130 and 230.

The two embodiments 130 and 230 of the diagnostic system according to the invention differ only in that the current sensors 161-164 are all oriented in the same way in the first embodiment 130, while they are alternately rotated by 180° in the second embodiment 230.

The current sensors 161-164 are preferably adhesively bonded to the bottom of the covering 141 by means of double-sided adhesive strips K or alternatively are fastened by means of screw connections (or connections comparable thereto; for example, plug-in or latching connections), which engage through retaining webs H of the current sensors 161-164.

The width B of the covering 141 corresponds to the width b of the cable duct 140. In the embodiments shown, it amounts to 50 mm.

The depth T of the covering is less than or equal to the depth t of the cable duct.

The diagnostic system 130 or 230 comprises a data collection facility 171.

The current sensors 161-164 each have a first connection A1 embodied as a socket and a second connection A2 embodied as a plug. The first connection A1 is embodied as a Micro USB socket at one cable end of a first cable K1 (USB cable), which in particular is at least 15 cm long. The second connection A2 is embodied as a Micro USB plug at one cable end of a second cable K2 (USB cable), which in particular is at least 15 cm long.

The plurality of current sensors 161-164, forming a communication bus 180, are connected to the data collection facility 171 and output their measurement data to the data collection facility 171 via the communication bus 180. To this end, they are interconnected in series.

The data collection facility 171 is embodied as an Internet of Things box (IoT box), which is embodied as part of a data collection arrangement 170. The data collection arrangement 170 also includes a current supply facility 172, which supplies the Internet of Things box 171 and, via the connected USB cables, also supplies the plurality of current sensors 161-164.

The data collection facility 171 (Internet of Things box) has a Micro USB interface A3—here in the form of a Micro USB socket. It additionally has a communication interface A4, in particular an antenna, for communicating with a higher-level information technology infrastructure W, which here is formed by what is known as a cloud.

As shown, the Micro USB plug A2 of the first current sensor 161 is plugged into a Micro USB socket A5 of a USB connection cable VK. A Micro USB plug A6 of the USB connection cable VK is plugged into the Micro USB socket A3 of the Internet of Things box 171.

The Micro USB plug A2 of the second current sensor 162 is plugged into the Micro USB socket A1 of the first current sensor 161. The Micro USB plug A2 of the third current sensor 163 is plugged into the Micro USB socket A1 of the second current sensor 162. The Micro USB plug A2 of the fourth current sensor 164 is plugged into the Micro USB socket A1 of the third current sensor 163. And the Micro USB plug of the final current sensor (not shown here) is plugged into the Micro USB socket of the penultimate current sensor (also not shown here).

The plurality of current sensors 161-164 are in each case suitably embodied to transfer the measurement data to the data collection facility 171 by means of a Modbus transfer protocol via the communication bus 180 (Modbus RTU).

As the figures show, a section 161a-164a of a respective one of the current sensors 161-164 can be opened in order to encompass one of the electrical connection cables 1-4 that is assigned to it in the manner of a clamp.

The part 161a-164a of the respective current sensor 161-164, which is embodied in the manner of a clamp, together with a further part of the current sensor 161b-164b, forms a sensor core to be closed. The respective part 161a-164a of the current sensors protrude, at least partially, into the cable duct (see in particular FIGS. 2 and 5 to 7).

Each of the current sensors 161-164 is at most 50 mm wide, at most 50 mm deep and at most 70 mm long. The embodiment of the current sensor shown is 45 mm wide, 37.5 mm deep. Its section between the retaining webs is 44 mm long.

Each of the current sensors is embodied as a direct current sensor with a measurement range from 10 to 200 mA.

In a further embodiment, not shown here, of the diagnostic system according to the invention, the sensors are divided into at least two sensor groups and assigned to separate cable ducts. A plurality of current sensors therefore form a first sensor group and a plurality of further current sensors form at least one further sensor group. In this context, the one sensor group is arranged in a covering of a cable duct, as in the two first embodiments of the diagnostic system according to the invention, and the at least one further sensor group is arranged in a further covering of a further cable duct. The plurality of current sensors and the further plurality of current sensors—here also forming a communication bus—are connected to a data collection facility and output their measurement data to the data collection facility via the communication bus. In this context, the current sensors each also have a first connection embodied as a USB socket and a second connection embodied as a USB plug. By way of the plug/socket combination used, it is possible to bridge larger distances between the spatially offset sensor groups using standard Micro USB cables, which have a USB socket at one end and a USB plug at the other end.

For installing the current sensors, the covering 141 is provided, which is suitably embodied for accommodating the plurality of current sensors 161-164 of the diagnostic system. The part 161a-164a of a respective one of the current sensors 161-164 is opened in order to encompass one of the electrical connection cables 1-4 that is assigned to it in the manner of a clamp, and is closed again once the respective connection cable 1-4 has been inserted. The plurality of current sensors 161-164 are arranged adjacent to one another in the longitudinal direction R1 of the covering 141 in said covering 141 and are fastened by means of the adhesive strips K. The plurality of current sensors 161-164 output their measurement data to the data collection facility 171 via the communication bus 180.

The invention claimed is:

1. A diagnostic system for a level crossing safeguarding system, the level crossing safeguarding system having a relay circuit with electrical connection cables that are guided, at least in sections, in a cable duct formed with a longitudinal side access, the diagnostic system comprising:
a plurality of current sensors;
a detachable cover for covering the longitudinal side access of the cable duct, said detachable cover being configured for accommodating said plurality of current sensors of the diagnostic system; and
said plurality of current sensors being disposed in said detachable cover adjacent one another in a longitudinal direction of said cover.

2. The diagnostic system according to claim 1, wherein said plurality of sensors are fastened in said cover.

3. The diagnostic system according to claim 1, wherein a width of said cover is substantially equal to a width of the cable duct.

4. The diagnostic system according to claim 1, wherein a depth of said cover is less than or equal to a depth of the cable duct.

5. The diagnostic system according to claim 1, further comprising a data collection facility, and
wherein said plurality of current sensors are connected to said data collection facility via a communication bus and said plurality of current sensors are configured to output measurement data to said data collection facility.

6. The diagnostic system according to claim 5, wherein said current sensors are configured to transfer the measurement data to said data collection facility by way of a serial transfer protocol via the communication bus.

7. The diagnostic system according to claim 5, wherein said data collection facility is an Internet-of-Things box with a communication interface for communicating with a higher-level information technology infrastructure.

8. The diagnostic system according to claim 7, wherein said interface of aid data collection facility is an antenna.

9. The diagnostic system according to claim 1, wherein each of said current sensors is formed with a section that can be opened in order to encase one of the electrical connection cables in a form of a clamp.

10. A current sensor for the diagnostic system according to claim 1, wherein a section of the current sensor is formed to be opened in order to encompass a respective one of the electrical connection cables assigned thereto in a form of a clamp.

11. The current sensor according to claim 10, wherein the part of the current sensor that is embodied as a clamp forms a part of a sensor core and protrudes at least partially into the cable duct.

12. The current sensor according to claim 10, wherein the current sensor has a width of no more than 50 mm.

13. The current sensor according to claim 10, wherein the current sensor has a depth of no more than 50 mm.

14. The current sensor according to claim 10, wherein the current sensor has a length of no more than 70 mm.

15. The current sensor according to claim 10, wherein the current sensor has a width of than 45 mm, a depth of less than 40 mm, and a length of less than 45 mm.

16. The current sensor according to claim 10, wherein the current sensor is a direct current sensor with a measurement range from 10 mA to 200 mA.

17. The current sensor according to claim 10, wherein:
the current sensor has a socket forming a first connection and a plug forming a second connection;
said first connection being a Micro USB socket at one cable end of a first cable having a length of at least 15 cm; and
said second connection being a Micro USB plug at one cable end of a second cable having a length of at least 15 cm.

18. A method of installing a diagnostic system in a level crossing safeguarding system, wherein the safeguarding system has a relay circuit with electrical connection cables, of which at least a plurality are guided in a cable duct, at least in sections, and wherein the cable duct has a longitudinal side access, the method comprising:
providing a detachable cover for the longitudinal side access, the cover being configured to accommodate a plurality of current sensors of the diagnostic system, and wherein a plurality of current sensors are arranged in the cover adjacent one another in a longitudinal direction of the cover;
opening a section of a respective one of the current sensors to encompass a respective one of the electrical connection cables in a manner of a clamp, and closing the section once the respective connection cable has been inserted.

19. The method according to claim 18, which comprises connecting the plurality of current sensors to form a communication bus that is connected to a data collection facility, and outputting measurement data from the current sensors to the data collection facility.

20. The method according to claim 19, which comprises outputting the measurement data to the data collection facility by way of a serial transfer protocol.

* * * * *